United States Patent [19]

Masubuchi

[11] Patent Number: 4,591,902

[45] Date of Patent: May 27, 1986

[54] MATRIX TYPE COLOR TELEVISION PANEL DRIVER CIRCUIT

[75] Inventor: Sadao Masubuchi, Tokyo, Japan

[73] Assignee: Citizen Watch Co., Ltd., Tokyo, Japan

[21] Appl. No.: 572,319

[22] Filed: Jan. 20, 1984

[30] Foreign Application Priority Data

Jan. 28, 1983 [JP] Japan .................................. 58-12279

[51] Int. Cl.⁴ ........................ H04N 9/30; H04N 3/14; H04N 5/66; H04N 5/74
[52] U.S. Cl. ..................................... 358/59; 358/236; 358/241; 340/767; 340/793; 340/798
[58] Field of Search ................. 358/59, 240, 241, 236; 315/169.1, 169.2, 169.3, 169.4; 340/767, 793, 798, 799, 800

[56] References Cited

U.S. PATENT DOCUMENTS

| | | | |
|---|---|---|---|
| 3,526,711 | 9/1970 | De Boer | 358/240 |
| 4,020,280 | 4/1977 | Kaneko et al. | 358/242 |
| 4,429,305 | 1/1984 | Hosokawa et al. | 340/798 |
| 4,481,511 | 11/1984 | Hanmura et al. | 340/799 |
| 4,554,539 | 11/1985 | Graves | 315/169.3 |

OTHER PUBLICATIONS

Pitt, Valerie, Editor, *The New Penguin Dictionary of Electronics*, Penguin Books, pp. 408–409, date unknown.
Jay, Frank, Editor in Chief, IEEE Standard Dictionary of Electrical and Electronic Terms, IEEE, New York, third edition, date unknown.
Chodil, G. J., et al.; "Good Quality TV Pictures Using a Gas-Discharge Panel"; IEEE Conference Record of 1972 Conference on Display Devices; New York; Oct. 11–12, 1972; pp. 77–81.

*Primary Examiner*—James J. Groody
*Assistant Examiner*—Randall S. Svihla
*Attorney, Agent, or Firm*—Koda and Androlia

[57] ABSTRACT

A column electrode driver circuit for a matrix type color television panel in which a color television picture is displayed by a time sharing drive comprises analog line memories, analog latch circuits and analog pulse width modulating circuits. The use of these analog circuits reduces the number of elements of a matrix type color television driver circuit.

1 Claim, 12 Drawing Figures

FIG. 4 CONTROL CIRCUIT

FIG.5 COLUMN ELECTRODE DRIVER

ANALOG COMPARATOR

BUFFER AMP. I, II

MATRIX TYPE COLOR TELEVISION PANEL DRIVER CIRCUIT

BACKGROUND OF THE INVENTION

1. Field of the Invention

This invention relates to a driver circuit for a matrix type color television panel in which a color television picture is displayed by a time sharing drive.

2. Description of the Prior Art

The matrix type color television panel described herein is designed so that the complete picture comprises picture elements divided in, for example, X and Y directions and each having at least one color picture element, for example, red (R), green (G) and blue (B). Each color picture element is given an electric signal to provide a color television display. For display materials, liquid crystal, fluorescent, electrochromic, ferroelectric materials and the like are available. Since this invention is concerned with a method of applying picture signals, it will be described hereinafter through the use of an example of liquid crystal.

The structure of a liquid crystal driver circuit for giving a color television picture display by a conventional time sharing drive is shown in a block diagram of FIG. 1. A color separation circuit 1-1 separates picture signals into R, G and B color signals and sends the R color signal to an analog-to-digital (A/D) converter 2-R, the G color signal to an A/D converter 2-G, and the B color signal to an A/D converter 2-B, respectively. Also, a synchronizing separation circuit 1-2 separates the incoming picture signals into synchronizing signals (horizontal synchronizing signals and vertical synchronizing signals) and sends them into a control circuit 3.

The A/D converter 2-R (G, B) transmits the R (G, B) color signal to a digital line memory 4-R (G, B). The digital line memory 4-R (G, B) stores one line of R (G, B) color signals and sends the data in parallel to a digital latch circuit 5-R (G, B) in synchronism with the signals of the control circuit 3, for example, during the flyback period of horizontal scanning lines. While holding the data during the horizontal scanning period, the digital latch circuit 5-R (G, B) sends the data to pulse width modulating circuits 6-1-R (G, B) to 6-n-R (G, B) each of which is also used as a column electrode driver.

Corresponding to the digital data from the digital latch circuit 5-R (G, B), the modulating circuits 6-1-R (G, B) to 6-n-R (G, B) modulate the output pulse width so as to control an effective voltage to be applied to column electrodes 8-1-R (G, B) to 8-n-R (G, B) for a liquid crystal color panel. The control circuit 3 is synchronized with the incoming synchronizing signals and gives a data shift order to the digital line memory 4-R (G, B), a latch order to the digital latch circuit 5-R (G, B) and a control order to a line electrode driver 7. The line electrode driver 7 selects one of line electrodes 9-1 to 9-m in accordance with the signals of the control circuit 3.

Next, to show the IC structure for driving one of the column electrodes 8-1-R (G, B) to 8-n-R (G, B), an enlarged circuit diagram of the digital line memory 4-R, digital latch circuit 5-R, and pulse width modulating circuit 6-1-R corresponding to the column electrode 8-1-R of FIG. 1 is given in FIG. 2. The A/D converter 2-R of FIG. 1 is for four bits. This number of bits is minimum for satisfying the quality of the display. In FIG. 2, 4-R' denotes a first column of the digital line memory 4-R of FIG. 1, and 5-R' denotes a first column of the digital latch circuit 5-R of FIG. 1. The first column 4-R' of the digital line memory 4-R comprises four D type flip-flops 12. Each of outputs 11-1 to 11-4 of the A/D converter 2-R of FIG. 1 is applied to each of the flip-flops 12 and stored therein in accordance with a data shift order pulse applied to a data shift order pulse line 10.

11-1' to 11-4' are output lines respectively for the next column. The digital latch circuit 5-R' also comprises four D type flip-flops 13. While the outputs of the digital line memory 4-R are held in the D type flip-flops 13 during the horizontal scanning period in accordance with a latch order pulse applied to a latch order pulse line 17, they are sent to a four-bit to 16-bit decoder 14 of the pulse width modulating circuit 6-1-R. The decoder 14 decodes the incoming four-bit signals and selects one of sixteen transmission gates 15 at its outputs to connect one of sixteen modulating signal lines 16-1 to 16-16 to a column electrode drive line 18, thus providing an intermediate modulating display.

The above-mentioned drive portion for the one-column electrode needs about 150 gates for the CMOS structure. For example, for 300 column electrodes, the column electrode drive portion needs a large number of gates, i.e. 45,000 gates. An increase in the number of gates decreases the IC yield and increases the area of IC chips and power consumption. Furthermore, from the standpoint of the entire driver circuit, A/D converters required for each R, G and B color signal bring about disadvantages such as the increased cost, large power consumption, large occupied volume of the driver circuit and the like. That is to say, because of the great number of gates and the necessity of A/D converters, the conventional circuit has disadvantages of high cost, large mounting area and high power consumption.

SUMMARY OF THE INVENTION

The object of the invention is to provide a low cost, compact, low power consumption, highly reliable matrix type color television panel driver circuit in which the number of elements is greatly reduced as compared with the above-mentioned conventional example. To attain this object, according to the invention, there is provided a matrix-type color television panel in which there are provided a reference analog data voltage generator for generating a reference analog data voltage which varies nonlinearly with time so as to correct a nonlinear relation between the input voltage for brightness and the actual display brightness on the liquid crystal television panel; an analog line memory for storing a picture input signal; an analog latch circuit for storing and transmitting said picture signal in synchronism with the latch order pulse; and an analog pulse width modulating circuit for comparing the picture signal stored in the analog latch circuit and the analog data voltage so as to generate a column driving pulse having a gamma corrected pulse width. This invention provides a MOS IC driver circuit for a matrix-type color television panel including a driver circuit for a matrix type color television panel in which line and column electrodes are provided and their intersections are driven by time sharing every line as color picture elements at which display material is located for displaying a color picture. The driver circuit includes a line and column electrode driver circuit for driving the line and column electrodes; a synchronizing separation circuit for separating picture signals into horizontal and vertical synchronizing signals; a color separation circuit for separating the picture signals into red, green and blue color signals; and a control circuit responsive to the synchronizing signals from the synchronizing separation circuit and the color signals from the color separation circuit for controlling the line and column electrode driver circuit. The control circuit includes a sampling pulse generator for generating a sampling clock during a predetermined scanning period, a latch order pulse generator for generating a latch order pulse during a predetermined flyback period, a reference analog data voltage generator for generating a reference analog data voltage, the reference analog data voltage being repeatedly developed and varying with time during the predetermined scanning period in accordance with the horizontal synchronizing signals from the synchronizing separation circuit, and a column start pulse generator for generating a column start pulse in accordance with the horizontal signals. The column electrode driver circuit includes an analog line memory circuit having a plurality of sampling pulse generators for generating independently one column of sampling pulses in accordance with the column start pulse and the sampling clock from the control circuit, a plurality of switching means for transmitting one line of separated color signals in accordance with the sampling pulses, and a plurality of analog memory means for storing the one line of separated color signals in analog values. The column electrode driver circuit further includes an analog latch circuit having a plurality of switching means for transmitting the analog values stored in the analog line memory means in accordance with a latch order pulse from the control circuit, and a plurality of analog memory means for storing the transmitted one line of color signals in analog values, an analog pulse width modulating circuit having a plurality of analog comparators for comparing each one of the column of analog values held by the analog latch circuit with the reference analog data voltage from the control circuit, and a power switching circuit for generating a column electrode driving signal having a pulse width in response to an output of the analog comparators.

DESCRIPTION OF THE PREFERRED EMBODIMENTS

Figure 1:
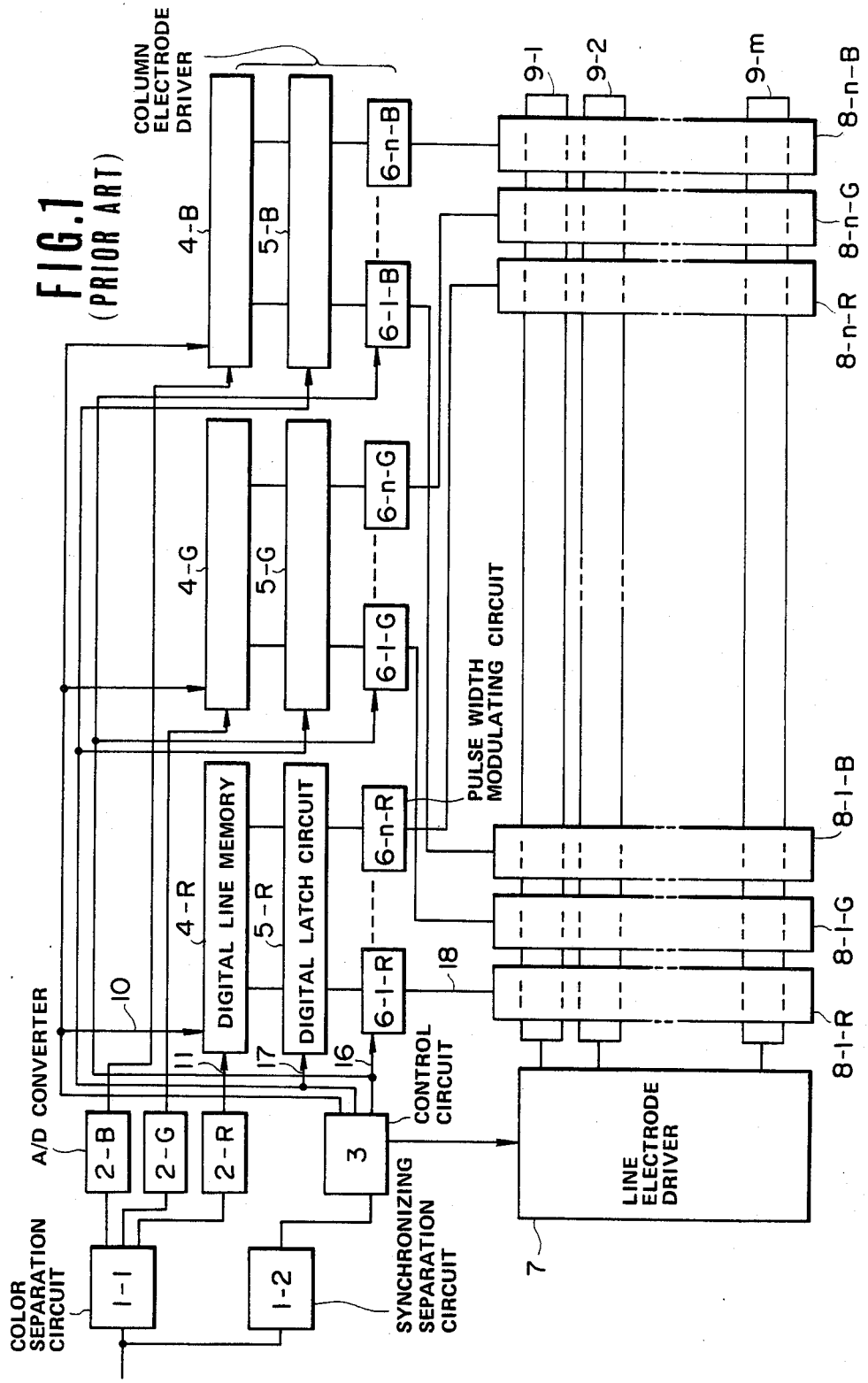
FIG. 1 is a block diagram illustrating an example of a conventional matrix type color television panel driver circuit.
Figure 2:
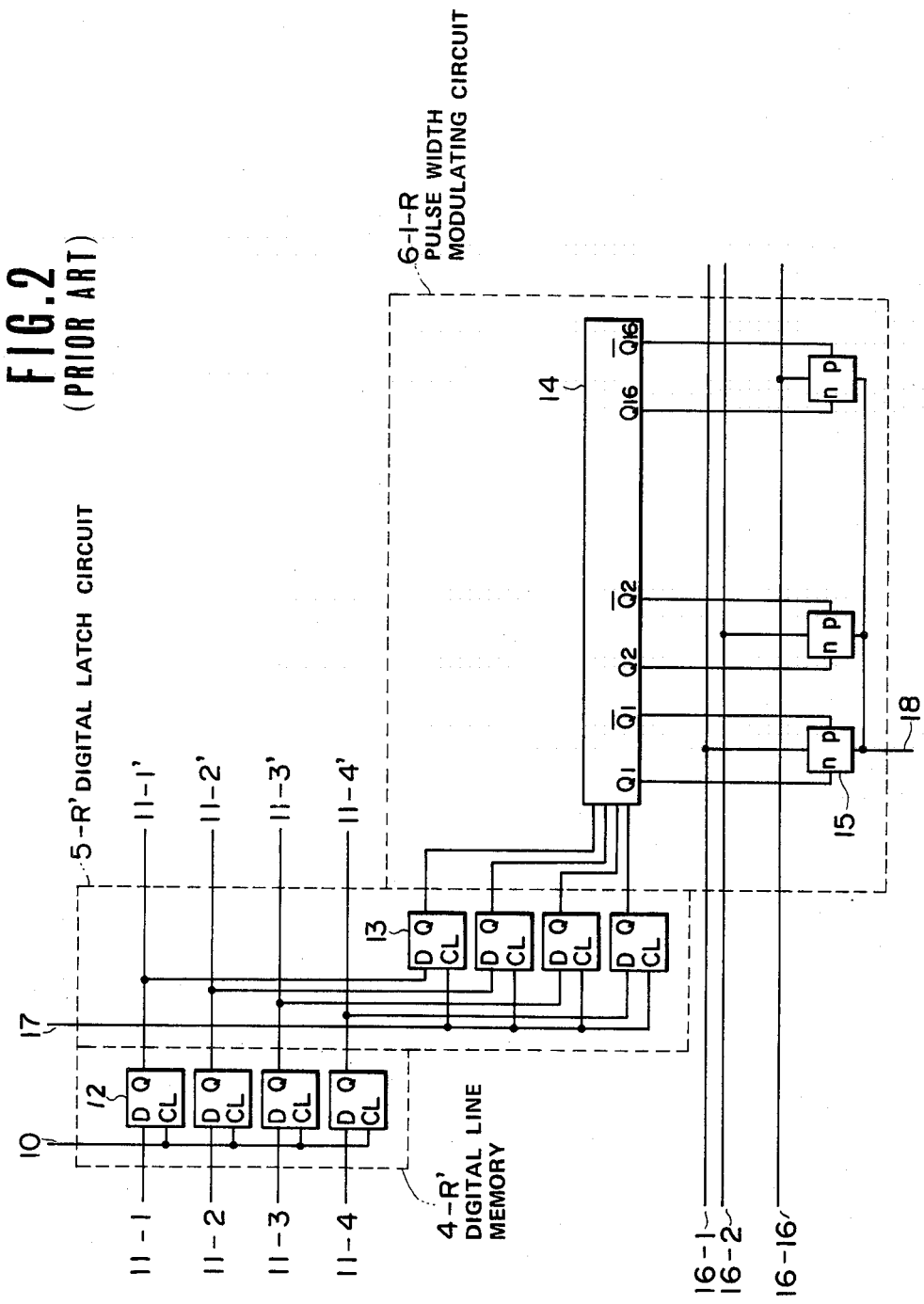
FIG. 2 is a detailed view of one column of a column electrode driver circuit of FIG. 1.

The manner of operation of the matrix type color television panel circuit according to the invention will be described in connection with the diagrams of FIGS. 3 to 6 and the time chart of FIGS. 7A and 7B wherein component parts having the same functions as those of the conventional example shown in FIGS. 1 and 2 are given the same numbers as in FIGS. 1 and 2.

Figure 3:
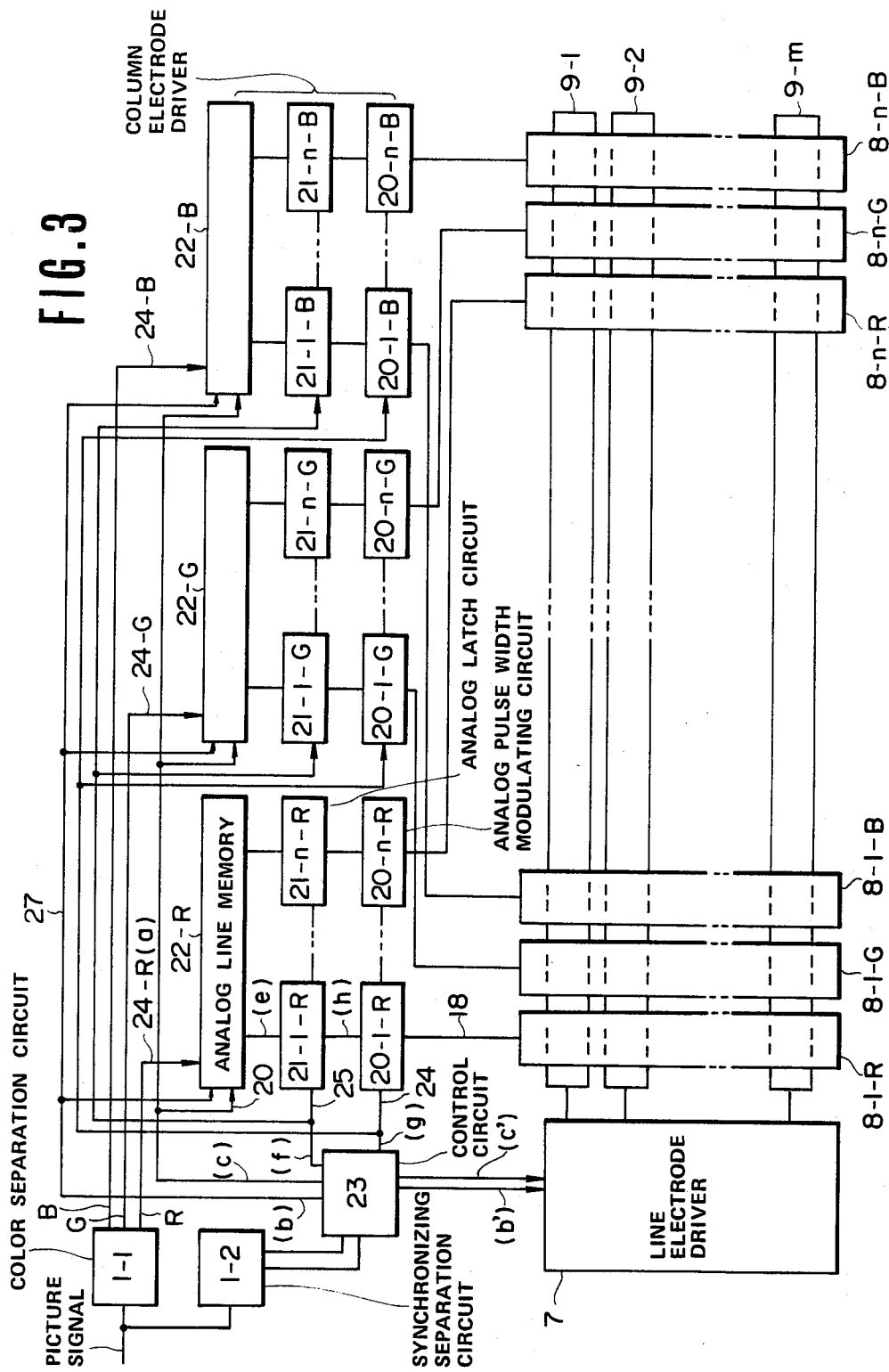
FIG. 3 is a block diagram of a matrix type color television panel driver circuit according to the invention.
Figure 4:
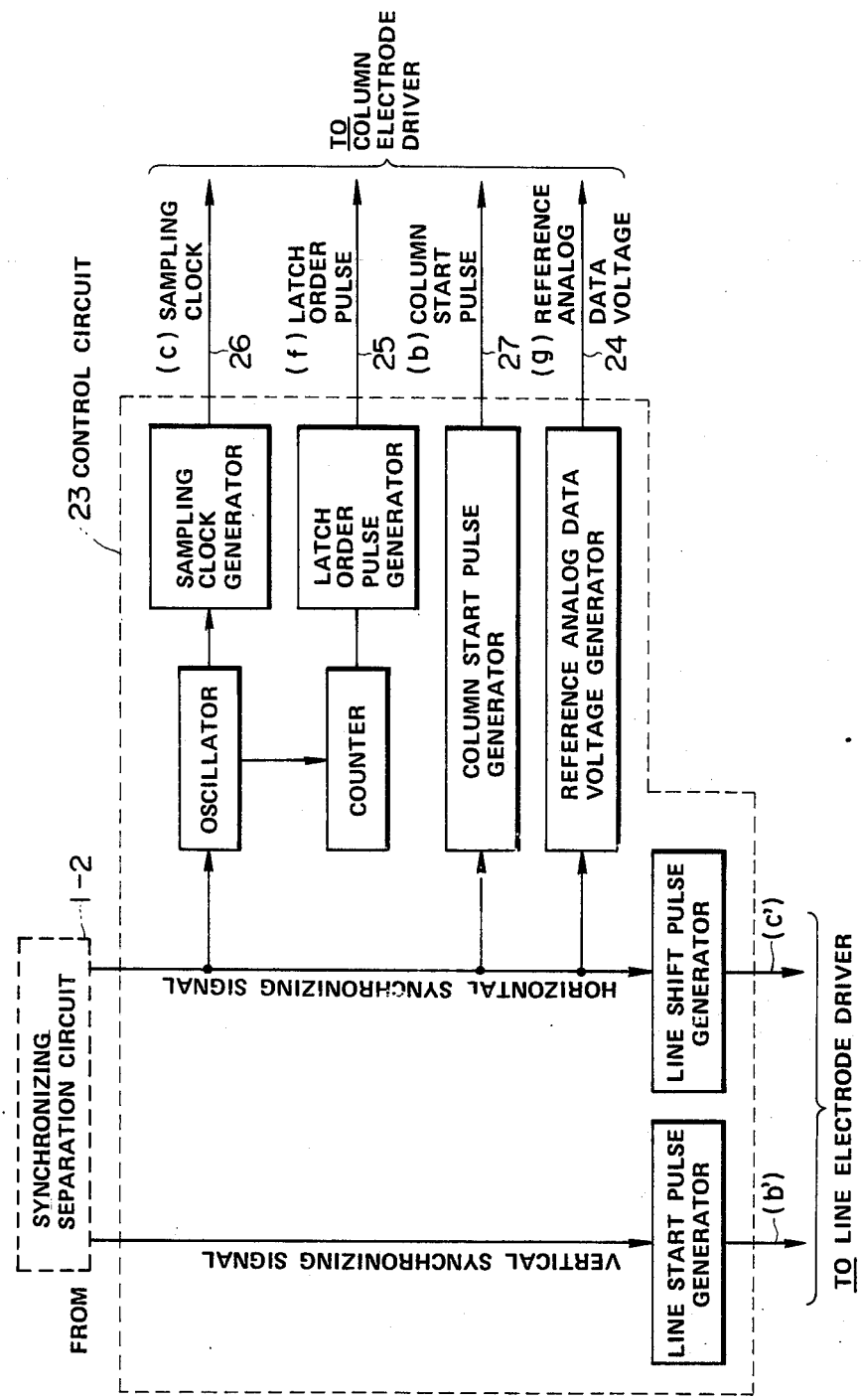
FIG. 4 is a detailed block diagram of a control circuit of FIG. 3.
Figure 5:
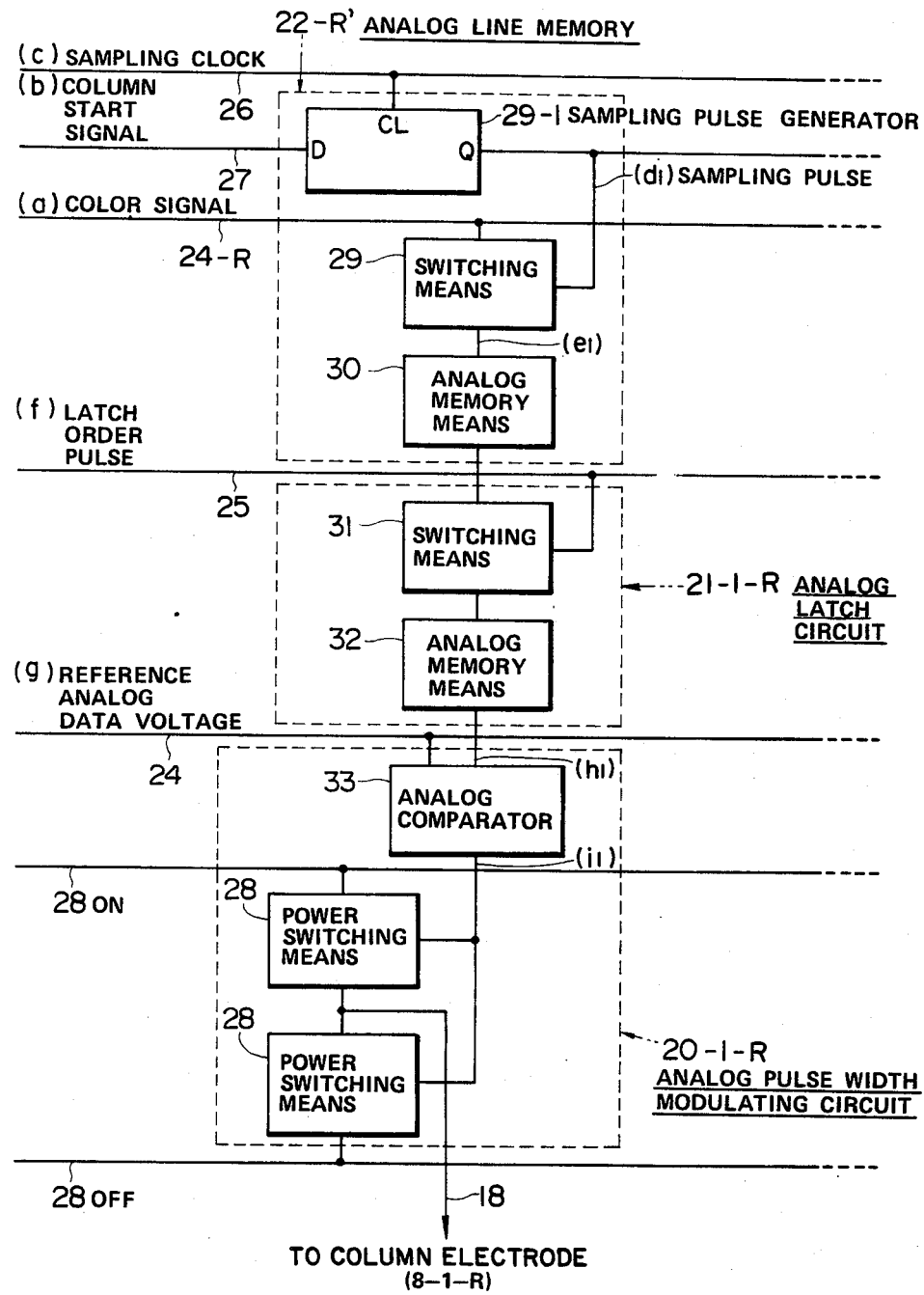
FIG. 5 is a detailed block diagram illustrating one column of a column electrode driver circuit of FIG. 3.
Figure 6:
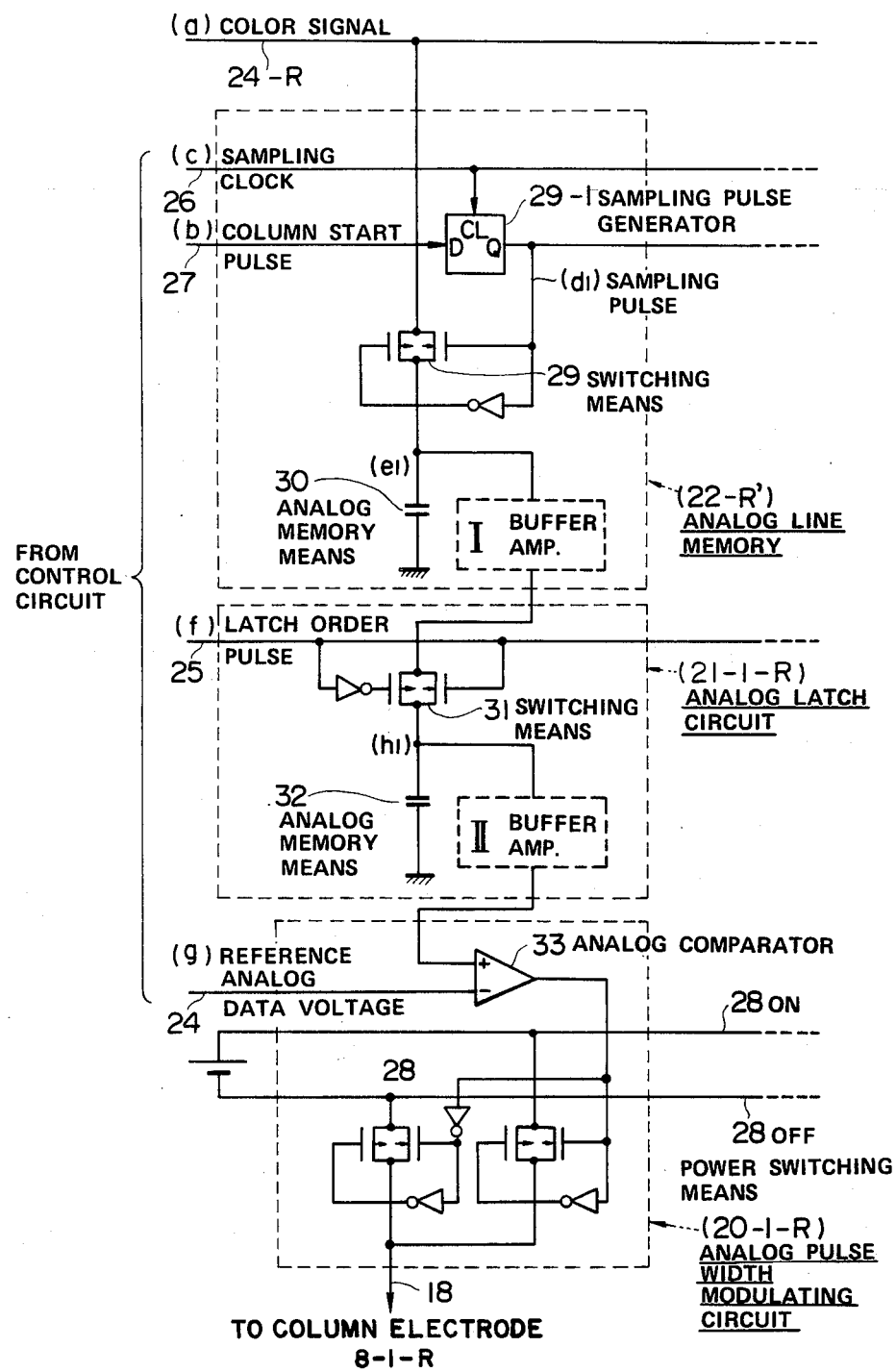
FIG. 6 is a detailed circuit diagram illustrating the column electrode driver circuit of FIG. 5.

Referring to FIG. 3, R, G and B signals separated by a color separation circuit 1-1 are sent to analog line memories 22-R, 22-G and 22-B, respectively in analog form without being digitized. The analog line memories 22-R, 22-G and 22-G store one line of R, G and B color signals respectively in accordance with orders (b), (c) of a control circuit 23. Next, analog latch circuits 21-1-R to 21-n-R, 21-1-G to 21-n-G and 21-1-B to 21-n-B store the analog values of the analog line memories 22-R, 22-G and 22-B respectively in parallel (simultaneously) in accordance with an order (f) of the control circuit 23 during the flyback period of horizontal scanning lines. While holding a content (h) during the horizontal scanning period, the analog latch circuits 21-1-R to 21-n-R, 21-1-G to 21-n-G and 21-1-B to 21-n-B send the content (h) to analog pulse width modulating circuits 20-1-R to 20-n-R, 20-1-G to 20-n-G and 20-1-B to 20-n-B, respectively. Each of the analog pulse width modulating circuits compares the analog value (h) supplied by the corresponding analog latch circuit with a reference analog data voltage (g) which is given by the control circuit 23 and varies with time, and then modulates the pulse width of the column electrode driving pulse, according to the above compared two values, thus controlling effective voltages to be applied to column electrodes 8-1-R to 8-n-R, 8-1-G to 8-n-G and 8-1-B to 8-n-B for a liquid crystal color panel.

As shown in FIGS. 3, 4, 7A and 7B, in accordance with synchronizing signals from a synchronizing separation circuit 1-2, the control circuit 23 produces the column start pulse (b) and the sampling clock (c) on lines 27 and 26 connected to each of the analog line memories 22-R, 22-G and 22-B, the latch order pulse (f) on line 25 connected to each of the analog latch circuits 21-1-R to 21-n-R, 21-1-G to 21-n-G and 21-1-B to 21-n-B, and the reference analog data voltage (g) on line 24 connected to each of the analog pulse width modulating circuits 20-1-R to 20-n-R, 20-1-G to 20-n-G and 20-1-B to 20-n-B, as well as control signals (b'), (c') to be applied to a line electrode driver 7.

Figure 7A:
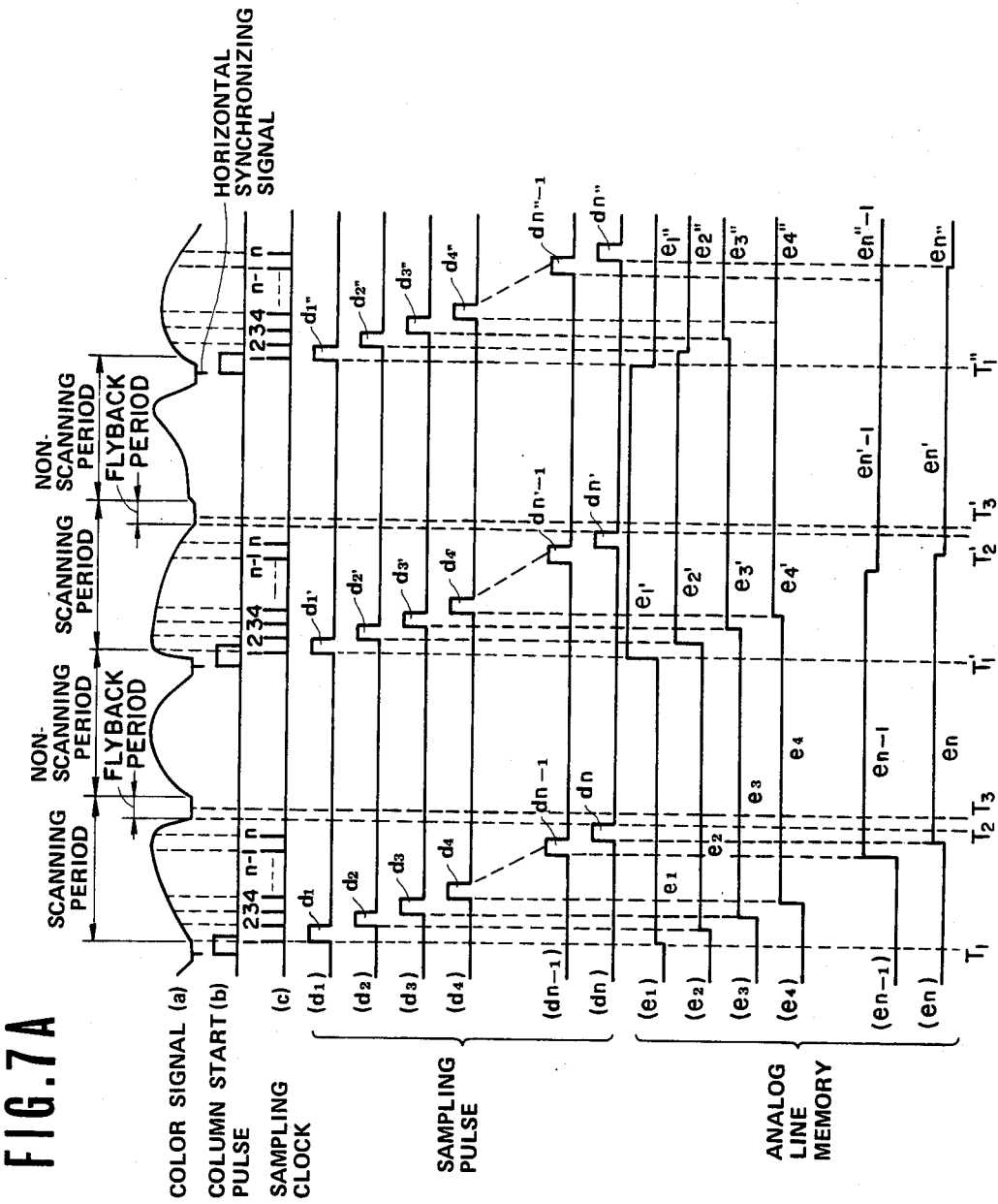
FIGS. 7A and 7B are a time chart illustrating the operation of FIGS. 3 to 6.
Figure 7B:
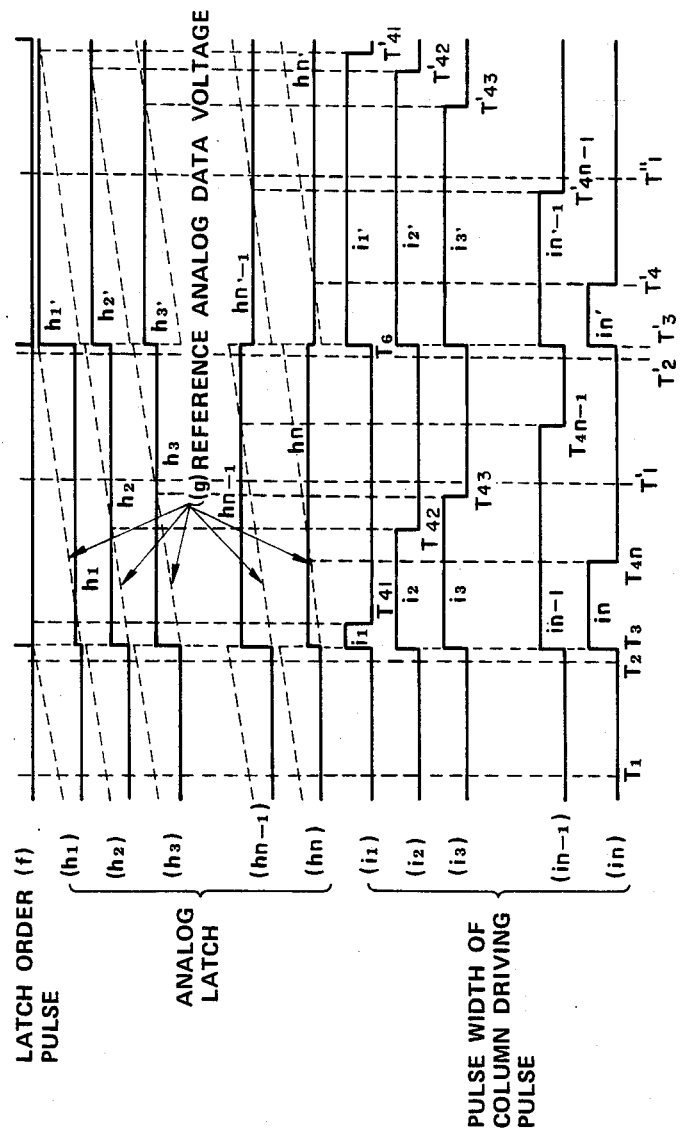

The column start pulse generator generates the column start pulse (b) indicating that the period for scanning has been reached (e.g. 1rst, 3rd and 5th periods of the picture signal in FIG. 7A (a)) in response to the horizontal synchronizing signal. The sampling clock pulse generator serves as a circuit for processing the output of the oscillator which operates on the horizontal synchronizing signal and triggers so as to generate the sampling pulse (c). The latch order pulse generator generates the latch order pulse (f) indicating that a nonscanning period has been reached in response to the output of the counter for counting the output of the oscillator which operates on the horizontal synchronizing signal. The reference analog data voltage generator is synchronized with the horizontal synchronizing signal and produces the reference analog data (g) which varies with time during the non-scanning period and the next scanning period, e.g. 2nd+3rd and 4th+5th periods in FIG. 7A (a). That is to say, in the present invention, a charge-and-discharge circuit comprising for example, MOS resistors, MOS capacitors and diodes is used, and its time constant is predetermined in order to conform to the gamma correction, thereby determining the timing by the horizontal synchronizing signal. However, since each of these circuits is well known by those skilled in the art, a further description will omitted here.

The manner of operation of the analog line memory 22-R, analog latch circuit 21-1-R, and analog pulse width modulating circuit 20-1-R which form a column electrode driver circuit for driving one column electrode 8-1-R of FIG. 3 is shown in detail in FIGS. 5, 6, 7A and 7B. An analog line memory 22-R' comprises a sampling pulse generator 29-1 having a shift register of a D type flip-flop; switching means 29 having a transmission gate; and analog memory means 300 having a capacitor. When the sampling clock (c) comes with the column start pulse (b) from the control circuit 23 present in the data terminal of the D type flip-flop, the data is inputted and then a sampling pulse ($d_1$) is produced. Similarly, as shown in FIG. 7A, sampling pulses $d_2$ to $d_n$ are produced in turn whenever the sampling clock (c) is inputted from the flip-flop of each column of the analog line memory 22-R. During the sampling time, the sampling pulse ($d_1$) operates the switching means 29 and stores the value of the wave form (a) at the time of $T_1$ which is applied to an R color signal line, into the analog memory means 30. The wave form stored in the analog memory means 30 is represented by $e_1$. In a similar way, the wave forms stored in the analog memory means 30 of the analog line memory 22-R of the next columns are represented by $e_2$ to $e_n$, respectively. At the time of $T_2$ after n samplings are completed, the sampling clocks stop.

The analog latch circuit 21-1-R comprises switching means 31 formed of a transmission gate; and an analog memory means 32 formed of a capacitor. This switching means 31 is operated by the latch order pulse f from the control circuit 23 at a certain time during the flyback period after the above n samplings are completed, for example, at the time of $T_3$ when the horizontal synchronizing signal comes, and then transmits the analog data $e_1$ stored in the analog memory means 30 into the analog memory means 32. This analog memory means 32 holds the analog data during the time of $T_3$ to $T_6$. The wave form held by the analog memory means 32 is represented by $h_1$, and also the wave forms held by the remaining analog memory means are respectively $h_2$ to $h_n$. As can be seen from these voltage wave forms, the data transmission from the analog line memory 22-R to the analog latch circuits 21-1-R to 21-n-R is performed at one time simultaneously at the time of $T_3$.

The analog pulse width modulating circuit 20-1-R comprises an analog comparator 33 and a power switching means 28. The analog comparator 33 compares the analog value $h_1$ held by the analog latch circuit 21-1-R with the reference analog data voltage g which is given by the control circuit 23 and varies with time, and then produces a column driving pulse $i_1$ having a pulse width corresponding to the time of $T_3$ to $T_{41}$ when the analog value $h_1$ exceeds the reference analog data voltage g. That is to say, this signal $i_1$ acts on the power switching means 28 and connects an ON potential line 28-ON which accepts a picture element ON signal, to the column electrode 8-1-R during the period of signal $i_1$. Then, by connecting an OFF potential line 28-OFF to the column electrode 8-1-R during the time of $T_{41}$ to $T_6$ when the analog value $h_1$ is smaller than the reference analog data voltage g, the voltage applied to the column electrode 8-1-R is modulated in accordance with the picture analog data. As can be seen from FIG. 7B, the analog values $h_1$ to $h_n$ and the reference analog data voltage g for one column of the analog latch circuit 21-1-R are compared in parallel (simultaneously), and the pulse width control signals $i_1$ to $i_n$ at the respective columns start being generated simultaneously at the time of $T_3$.

Figure 8:
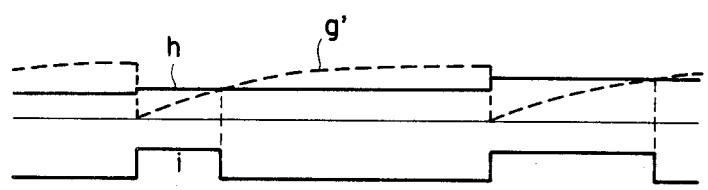
FIG. 8 is a wave form chart of a nonlinear reference analog data voltage at the time of gamma correction.
Figure 9:
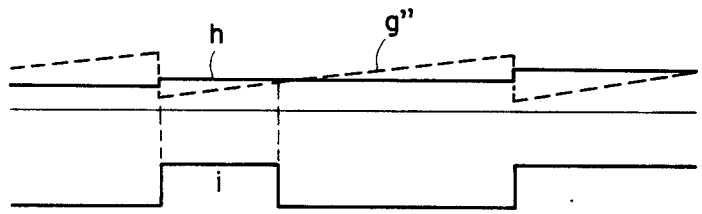
FIG. 9 is a wave form chart of a reference analog data voltage at the time of automatic level control.

Although the aforementioned embodiment shows the case where the reference analog voltage g varies linearly with time, the relation between the input voltage for brightness and the actual display brightness on the liquid crystal panel represents nonlinearity. Gamma correction for changing the relation from non-linearity to linearity can be made, as shown in FIG. 8, by using a reference analog data voltage g' which varies nonlinearly with time.

Figure 10:
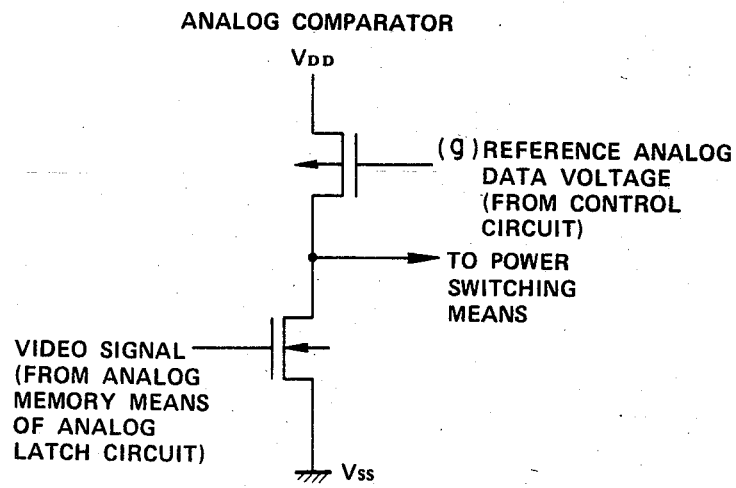
FIG. 10 is a view showing an embodiment of an analog comparator of FIG. 6.

As shown in FIG. 10, the analog comparator 33 forming a component part of the analog pulse width modulating circuit 20-1-R may be formed of, for example, a simple differential amplifier including two field effect transistors (FETs).

Figure 11:
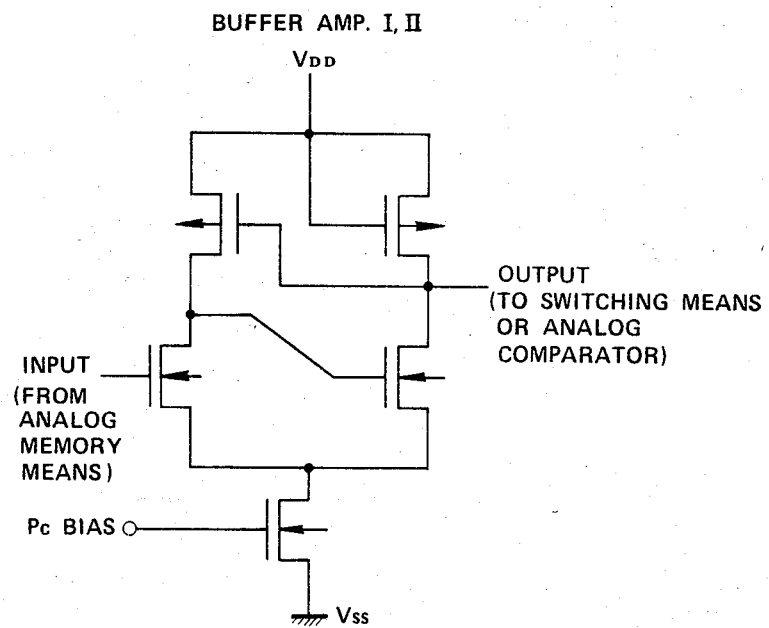
FIG. 11 is a view showing an embodiment of a buffer amplifiter of FIG. 6.

Also, as shown in FIG. 11, if a buffer amplifier including FETs is provided either between the analog line memory and the analog latch circuit or between the analog latch circuit and the analog comparator, the same function of the circuit can be provided as when there is no buffer amplifier. It is also possible to use a charge transfer element such as a charge coupled device (CCD) as the analog line memory and analog latch circuits. This invention is also effective if an nonlinear element such as a diode or a varistor is arranged in color picture elements existing at the matrix intersections and voltage applied to the picture elements at intersections is controlled by pulse amplitude modulation (PAM).

According to the invention, the number of gates for a one-column electrode driver circuit is about 16. As already stated above, since the conventional example requires about 150 gates, the number of gates of the invention is reduced to about 1/10 of the conventional example. Furthermore, this invention eliminates the need for the three A/D converters which are essential to the conventional example.

As mentioned above, according to the invention, the use of analog line memories, analog latch circuits, and analog pulse width modulating circuits reduces the number of elements of the matrix type color television panel driver circuit. The invention meets the requirements for low cost, compactness, low power consumption, and high reliability.

What is claimed is:

1. An MOS driver circuit for a matrix-type color television panel having color picture elements including a liquid crystal display material located at intersections of line and column electrodes for displaying a color picture by driving one line of picture elements at a time in a time-sharing manner comprising:
    (1) line and column electrode driver circuits for driving said line and column electrodes;
    (2) a synchronizing separation circuit for separating horizontal and vertical synchronizing signals from picture signals;
    (3) a color separation circuit for separating red, green and blue color signals from said picture signals; and (4) a control circuit responsive to the synchronizing signals from said synchronizing separation circuit for controlling said line and column electrode driver circuits, said control circuit including:
  (a) a sampling clock generator for generating a sampling clock during a predetermined scanning period,
  (b) a latch order pulse generator for generating a latch order pulse during a predetermined flyback period,
  (c) a reference analog data voltage generator for generating a reference analog data voltage, said reference analog data voltage being repeatedly generated and varying nonlinearly with time so as to correct a nonlinear relation between an input voltage representing brightness and an actual display brightness on the liquid crystal television panel during the predetermined scanning period in synchronism with the horizontal synchronizing signal from said synchronizing separation circuit, and
  (d) a column start pulse generator for generating a column start pulse in synchronism with the horizontal synchronizing signal, said column electrode driver circuit including:
  (a) an analog line memory circuit having,
    (i) a plurality of sampling pulse generators each for generating independently a sampling pulse for one column in synchronism with the column start pulse and the sampling clock from said control circuit,
    (ii) a plurality of first switching means comprising transmission gates for transmitting one line of separated color signals in synchronism with said sampling pulses,
    (iii) a plurality of first analog memory means comprising capacitors for storing said one line of separated color signals transmitted by said first switching means as analog values, and
    (iv) a plurality of first buffer amplifiers for amplifying said separated color signals stored in said first analog memory means,
  (b) an analog latch circuit having,
    (i) a plurality of second switching means comprising transmission gates for transmitting said one line of separated color signals stored in said first analog memory means after being amplified by said first buffer amplifiers in synchronism with said latch order pulse from said control circuit,
    (ii) a plurality of second analog memory means comprising capacitors for storing said one line of separated color signals transmitted by said second switching means as analog values, and
    (iii) a plurality of second buffer amplifiers for amplifying said separated color signals stored in said second analog memory means, and
  (c) an analog pulse width modulating circuit having,
    (i) a plurality of analog comparators comprising differential amplifiers each for comparing one of said analog values stored in said second analog memory means after being amplified by said second buffer amplifiers with the reference analog data voltage from said control circuit, and
    (ii) a plurality of power switching circuits for generating column electrode driving signals each having a pulse width determined by an output of one of said analog comparators.

* * * * *